(12) United States Patent
Hernandez

(10) Patent No.: US 6,637,904 B2
(45) Date of Patent: Oct. 28, 2003

(54) WIRELESS QUICK RELEASE LIGHTING SYSTEM WITH SUPPORTS, MOUNTING BRACKETS, LIGHTS, AND ACCESSORIES

(76) Inventor: Refugio E. Hernandez, 13662 Cherrydown St., Sugar Land, TX (US) 77478

( * ) Notice: Subject to any disclaimer, the term of this patent is extended or adjusted under 35 U.S.C. 154(b) by 0 days.

(21) Appl. No.: 10/082,230

(22) Filed: Feb. 25, 2002

(65) Prior Publication Data

US 2003/0161135 A1 Aug. 28, 2003

(51) Int. Cl.[7] .......................... G03B 15/03; G09F 15/00
(52) U.S. Cl. ................. 362/8; 362/7; 362/11; 362/413; 362/812; 40/553; 40/610
(58) Field of Search .................. 362/3, 7, 8, 11–13, 362/110–114, 269, 413, 418, 419, 427, 812; 396/419, 428, 429; 40/553, 554, 610

(56) References Cited

U.S. PATENT DOCUMENTS

| | | | | |
|---|---|---|---|---|
| 2,551,753 A | * | 5/1951 | McCullough | 362/8 |
| 2,839,668 A | * | 6/1958 | Mills | 362/8 |
| 3,258,585 A | * | 6/1966 | Crete | 362/13 |
| 3,333,519 A | * | 8/1967 | Padelt | 362/8 |
| 4,409,751 A | * | 10/1983 | Goda et al. | 42/94 |
| 4,430,638 A | * | 2/1984 | Parker | 40/550 |
| 4,648,697 A | * | 3/1987 | Kawazoe | 396/419 |
| 4,929,973 A | * | 5/1990 | Nakatani | 396/419 |
| 5,173,563 A | * | 12/1992 | Gray | 42/94 |
| 5,326,058 A | * | 7/1994 | Beaver et al. | 396/419 |
| 5,400,234 A | * | 3/1995 | Yu | 362/419 |
| 5,862,967 A | * | 1/1999 | Johnson | 224/577 |
| 6,104,313 A | * | 8/2000 | Boyd, II | 40/610 |
| 6,265,969 B1 | * | 7/2001 | Shih | 340/468 |
| 6,272,785 B1 | * | 8/2001 | Mika et al. | 42/94 |

* cited by examiner

*Primary Examiner*—Alan Cariaso
(74) *Attorney, Agent, or Firm*—Michael B. Jolly

(57) ABSTRACT

A wireless quick release lighting system with portable tripod support powered by either disposable or rechargeable batteries. The tripod is easily collapsed and stored with the light, mounts and accessories and includes a quick release connection for attaching brackets that support a plurality of accessories which include various light designs, gun support, gun mount, window mount, and magnetic mount. The tripod includes reflectors attached to the legs, and lighting accessories attachable to one or more of the tripod legs. The light designs may include flashing or blinking emergency lights and/or strobes for emergency scene use, utility lights, spotlights, flashing spotlight, text and warning lights. The accessories attachable to the mounting brackets include gun barrel support and gun mount for hunting purposes law enforcement, military, in combination with a binocular support, night vision scope or spotting scope mount and light for target practice. The accessories may also include video or still camera mounting in combination with a light source or multiple light sources, directional lights, or text and warning lights.

6 Claims, 8 Drawing Sheets

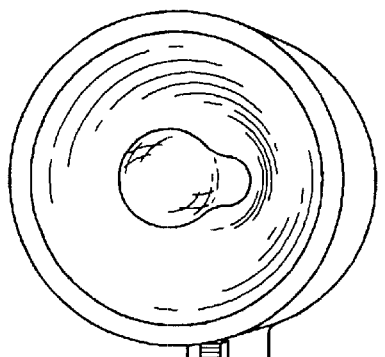
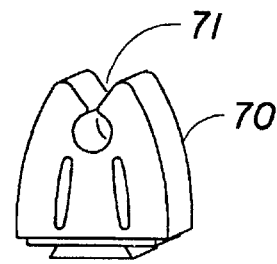
*Fig. 6B*
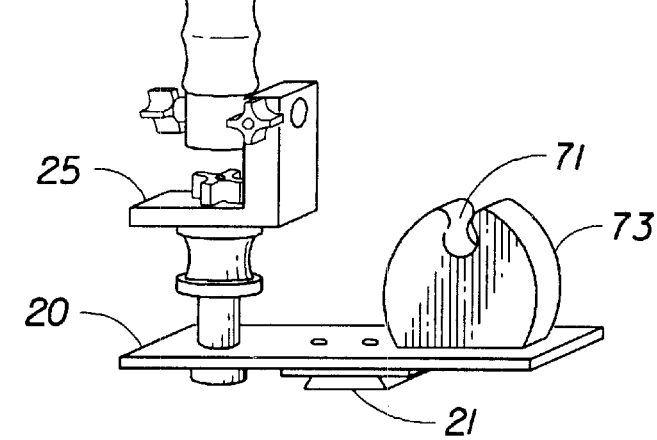
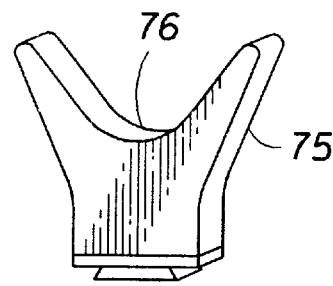
*Fig. 6C*
*Fig. 6A*
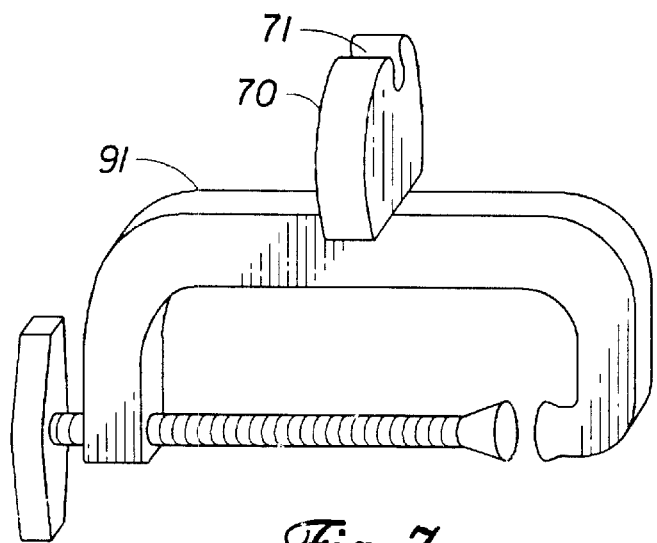
*Fig. 7*

WIRELESS QUICK RELEASE LIGHTING SYSTEM WITH SUPPORTS, MOUNTING BRACKETS, LIGHTS, AND ACCESSORIES

TECHNICAL FIELD

The present invention relates to emergency and rescue lighting systems and more particularly to wireless lighting system supports, quick release mounting brackets with lights connectable thereto and various accessories including quick release spotlights, flashing spotlights, emergency lights, text and warning light, flash lights, utility lights, quick release combinations of gun rest and spotlight, quick release combinations of gun rest and binoculars, quick release combinations of spotlight and video camera system. The quick release system allows any combination of accessories used for law enforcement, industry, commercial, consumer, emergency medical personnel, fire and rescue, hunting and fishing, marine and military. All accessories are also mountable to a quick release window system, a quick release magnetic system, a quick release tripod system.

BACKGROUND ART

Although portable lighting systems have existed for some time prior to the present invention there has not been a portable wireless lighting system which includes a quick release connection mounting system for mounting lights in combination with a selection of accessories upon various supports such as a tripod, window mounting system, magnetic mounting system, or clamp support and mounting brackets which allows to user to quickly and easily change the accessories and or light(s) attached to the tripod, window mounting system, magnetic mounting system, or clamp support, so that the lighting system and accessories may be easily adapted for any particular situation. The light designs include emergency flashers, blinkers, flashing spotlights, text and warning lights, flash lights, mini lights, strobes, flood lights, spotlights, area lights, and directional lights all of which can be provided in various colors. The attachable accessories include; quick release gun barrel support, quick release gun stock clamp, quick release spotlight, video or still camera combination, quick release gun rest and spotlight combination, quick release gun rest and binocular combination, quick release spotlight and emergency light combination, quick release gun rest and night vision scope combination, quick release gun rest and spotting scope mount. Accordingly, the lighting system and accompanying accessories are useful in emergency vehicular traffic situations such as a vehicle accident sight investigation, fire and rescue, emergency medical personnel, law enforcement, industrial, commercial, consumer, hunting and fishing, marine, military, target practice, temporary lighting needs, and during any time when an accurate wireless light support is needed.

GENERAL SUMMARY DISCUSSION OF INVENTION

It is thus an object of the invention to provide a quick release wireless lighting system which utilizes a number of light designs alone or in combination with each other and or in combination with accessory mounting and or support means wherein the light designs may include emergency flashing lights, strobe lights, blinking lights, flood lights, spotlights, directional lights, flashing spotlights, text and warning lights, flash lights, utility lights and the accessory mounts and or supports may include a gun barrel support, a gun stock mount, window mount, a magnetic mount, and light support mount.

It is intended that a an object of the quick release wireless lighting system with support, mounting brackets, light, and accessories includes a tripod support which will collapse and reduce in size for easy storage and which includes legs with reflective elements attached thereto providing a means for easily spotting the tripod legs during the night and further providing additional visibility of the tripod at night during use. The reflective material is particularly useful on the tripod when in use during emergency situations such as redirecting vehicular traffic at night.

It is intended that a an object of the quick release wireless lighting system with support, mounting brackets, light, and accessories includes a clamping support which will quickly clamp on a stationary article which may have any orientation including vertical or horizontal and wherein the clamp support includes a pivoting mount arm to which a mounting bracket is releaseably attached, and further wherein the pivoting mount arm is biased to retain a desired position. The mounting bracket, to which the light(s) and or accessories are attached, is attachable to either the tripod support, quick release window mount, quick release magnetic mount, or the clamp support. The clamp support is particularly useful for clamping to vehicle windows, fender wells, bumpers, truck tailgates, roof, or to a opened hood of an incapacitated vehicle, or any stable article which will support the light(s) and or accessories. The quick release magnetic mount is particularly useful for attaching the lighting and mounting system to metal surfaces in any orientation.

It is a further object of the invention to provide a quick release wireless lighting system with support, mounting brackets, lights, and accessories which includes mounting brackets or a mounting bracket that is easily and quickly removed and attached to the top of the tripod and wherein the mounting bracket includes a plurality of quick release mounting locations for attaching one or a plurality of lights or accessories either alone or in any number of combinations.

It is a further object of the invention to provide a quick release wireless lighting system with support, mounting brackets, lights, and accessories wherein the lights are powered by either disposable or rechargeable batteries, and wherein a remote rechargeable battery with power cable attachable cable may be provided to supply extended power to the light(s) when needed for use of the light(s) during extended operation.

DESCRIPTION OF DRAWINGS

For a further understanding of the nature and objects of the present invention, reference should be had to the following detailed description, taken in conjunction with the accompanying drawings, in which like elements are given the same or analogous reference numbers and wherein:

FIG. 6 is a front view of a quick release wireless spotlight, warning light, and gun rest system with a front perspective view of a gun barrel support, a front perspective view of a gun stock support.

FIG. 7 is a side view of a detachable clamp with gun barrel support attached thereto.

EXEMPLARY MODE FOR CARRYING OUT THE INVENTION

The quick release wireless lighting warning system with supports, mounting brackets, lights and accessories includes numerous arrangements for supporting and directing light sources such as spotlights, flood lights, emergency police lights, strobe light, flasher lights, flashing spotlights, text and warning lights, flashlights, mini lights, utility lights and warning lights. The lights may be mounted singularly or in combination with other lights and or accessories. The light system are particularly suitable for holding light sources for illumination of specific items without the need for a person to provide assistance and warning lights for traffic alert or control.

Figures 1, 2, 3:
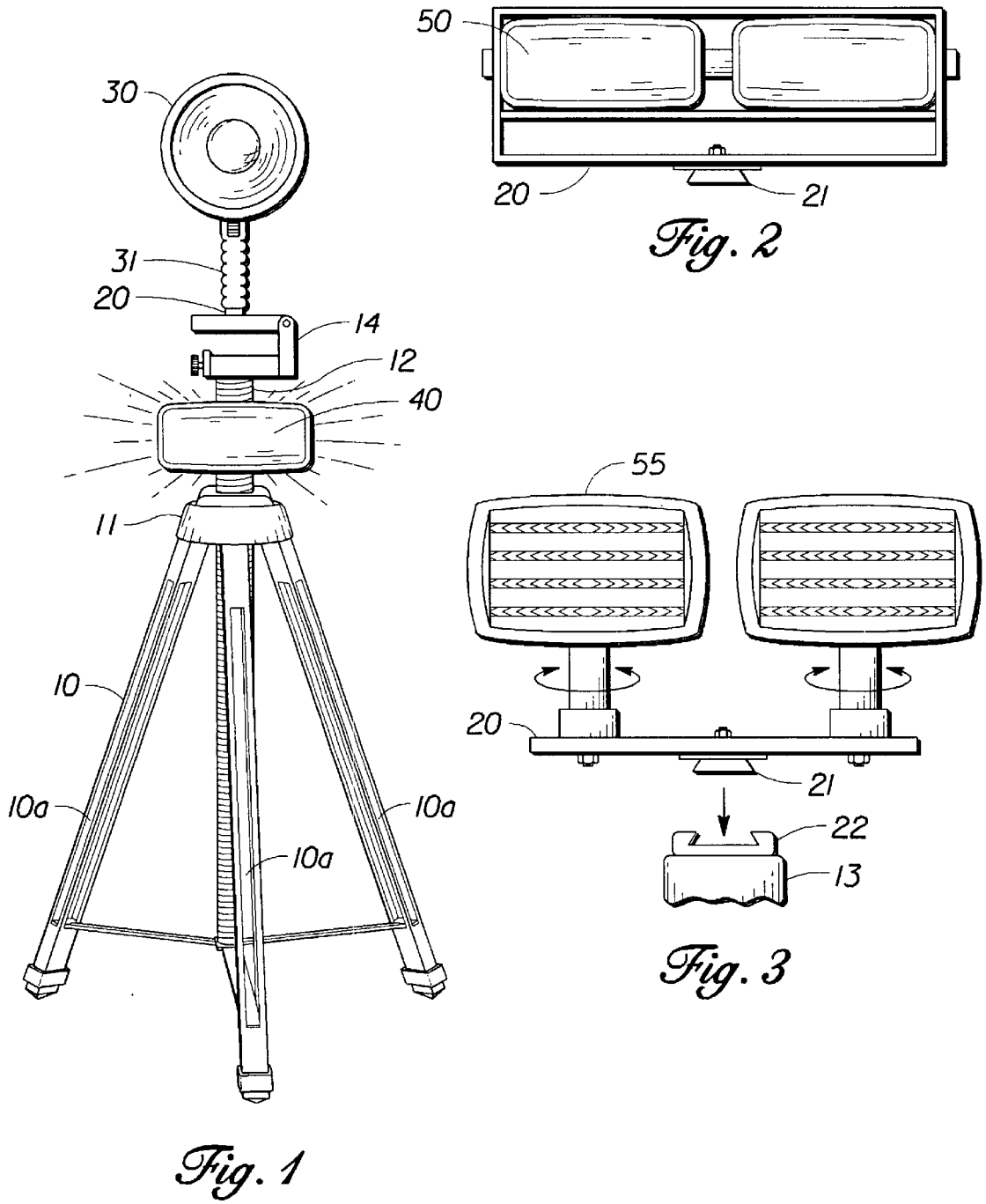
FIG. 1 is a front view of the quick release wireless lighting and warning system with tripod support, single light mounting bracket, spotlight, with warning light attached to the tripod.
FIG. 2 is a front view of quick release double flasher fire, rescue, law enforcement, industrial, commercial, marine, military, hunting and fishing and consumer lights attachable to either the tripod, window mount, magnetic mount or clamping mounts.
FIG. 3 is a front view of quick release separated double flasher fire, rescue, law enforcement, commercial, industrial, marine, hunting and fishing, and consumer lights attachable to either the tripod, window mount, magnetic mount or clamping mounts.
Figure 13:
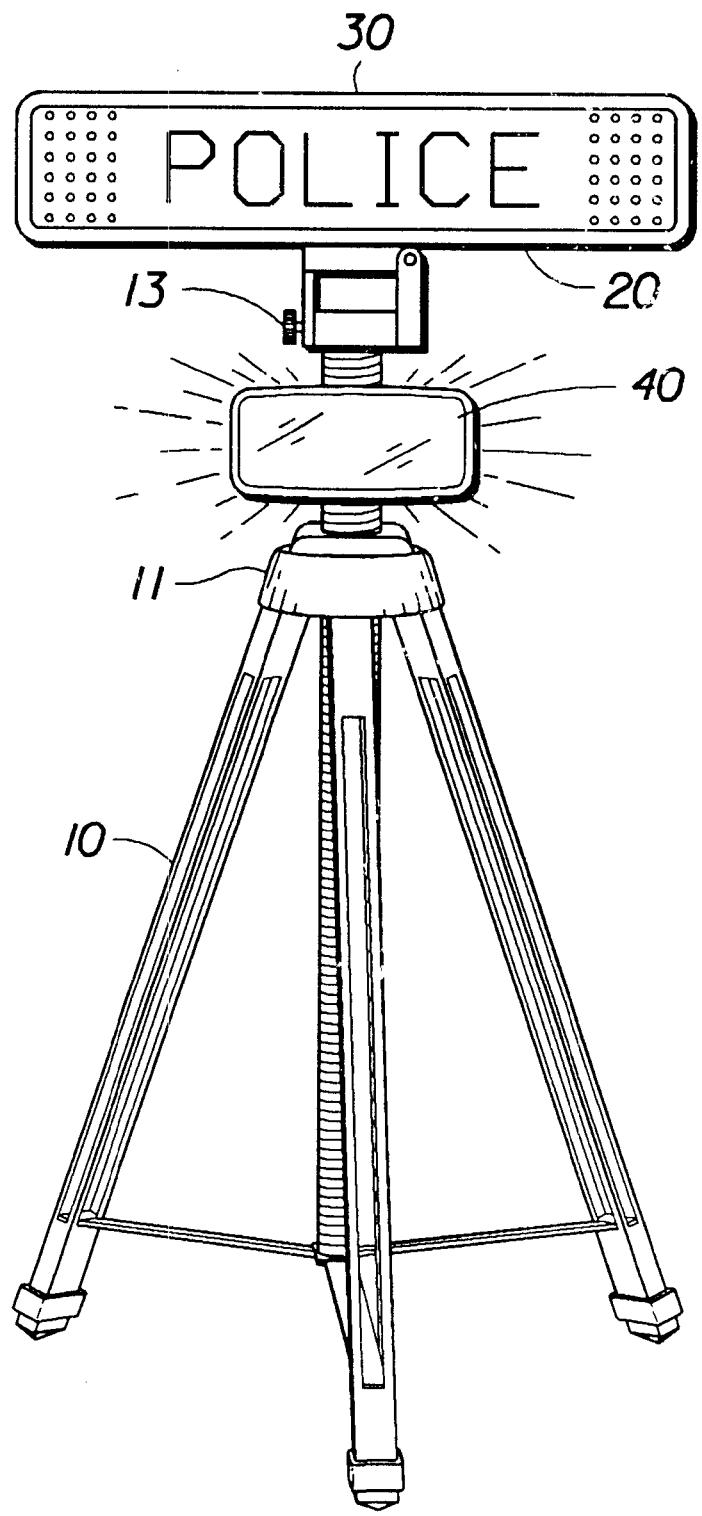
FIG. 13 is a front view of the quick release wireless lighting and warning system with tripod support, light mounting bracket, warning light with text message, with single warning light attached to the tripod.
Figure 14:
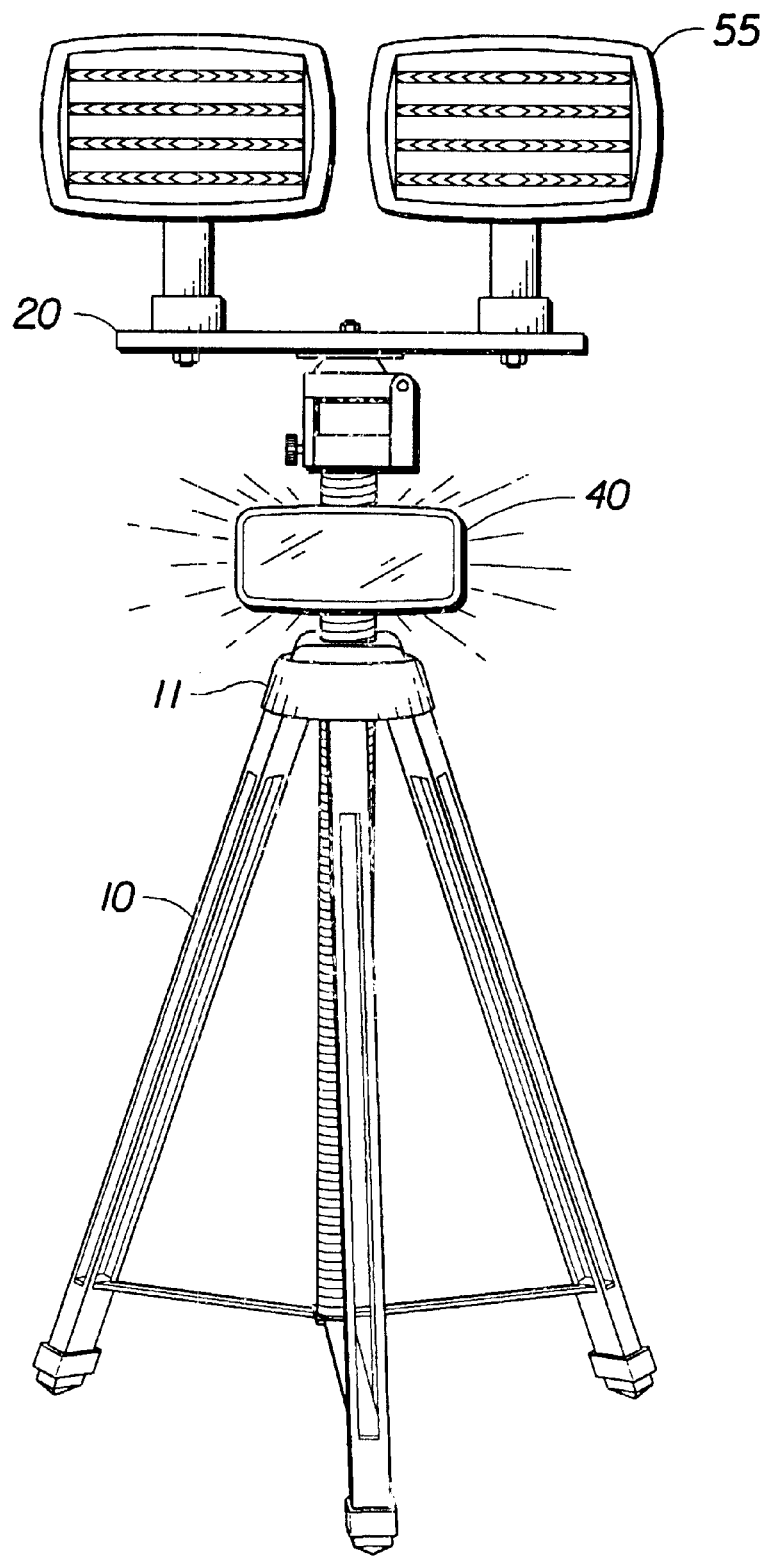
FIG. 14 is a front view of the quick release wireless lighting and warning system with tripod support, light mounting bracket, double warning light, with single warning light attached to the tripod.

FIG. 1 illustrates a basic setup of the lighting system utilizing a tripod support 10, which is collapsible for easy storage and transport. The tripod includes a upper end 12 which may be raised and lowered from a central tripod frame 11, while a top end 13 of the upper end 12 of the tripod includes wedge receiver 22 and a pivotal mount 14 to which a mounting bracket 20 is attached. The mounting bracket 20 is easily and quickly removed or attached to the tripod. The mounting bracket 20 is further illustrated in FIGS. 2, 3, 4, 5, 6, 8 and 9 and is generally an elongated rectangular member with a wedge coupler 21 that mates with the wedge receiver 22 on the top end 13 of the upper end 13 of the tripod. The mounting bracket may be about two to about twelve inches long so that a number of lights or accessories may be attached thereto. The lights and or accessories are releaseably attachable to the mounting bracket so that they are easily and quickly disconnected for the mounting bracket and replaced or removed if desired. FIG. 1 further illustrates a light 30 which may be either a spot, flood, flasher, strobe, text message (as illustrated in FIG. 13) or emergency lights as desired and any number of which (as illustrated in FIG. 14). The light 30 is attached at the end of the handle 31 and is easily directed and aimed at a desired location and locked in place for complete hands free operation and illumination of an area. The lights, including light 30 in FIG. 1 and the other lights illustrated in the figures and preferable battery operated so that the lighting system is wireless. The batteries may either be disposable or rechargeable. FIG. 1 also illustrates a mounted warning light 40 below the upper end of the tripod and may be a flashing light, strobe, or blinking light and serves as warning light which may be independently activated from light 30.

All lighting elements and accessories elements, such as gun stock and barrel mount, video and camera mounts, can be attached to supports other than a tripod 10 and may include a window clamp support 80 and a magnetic support 95 as illustrated in FIGS. 9, 10, 11 and 12.

FIG. 2 illustrates a set of emergency warning lights 50 which can be easily placed on the tripod 10 (or other support, either magnetic or window clamp) in place of or in addition to light 30. The warning lights 50 includes two light of the same or different lense color and each alternately flashes or blinks to provide maximum warning at emergency scenes when needed. FIG. 3 illustrates a set of warning lights 55 which may be independently rotated in the direction of arrows 52 to provide visibility in wider angles. The lights are preferable LED type lights to conserve electrical power and provide maximum illumination.

Figure 4:
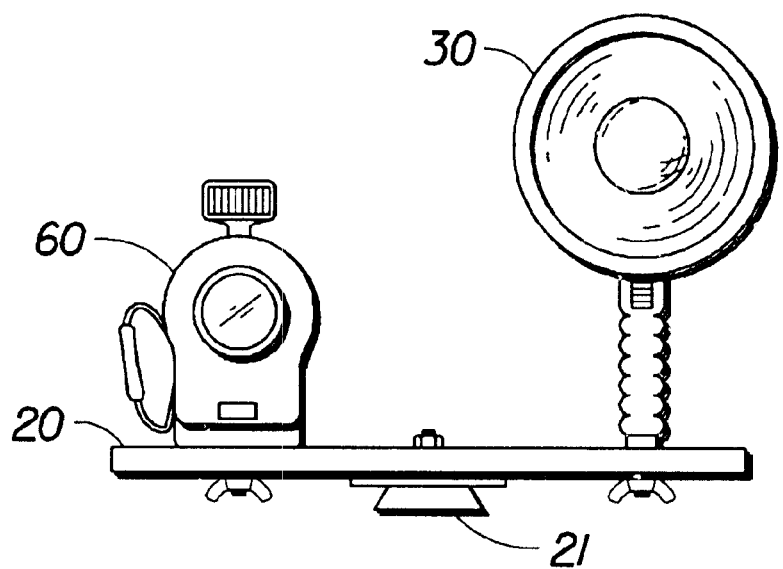
FIG. 4 is a front view of a quick release wireless spotlight and warning system with attached video camera.
Figure 5:
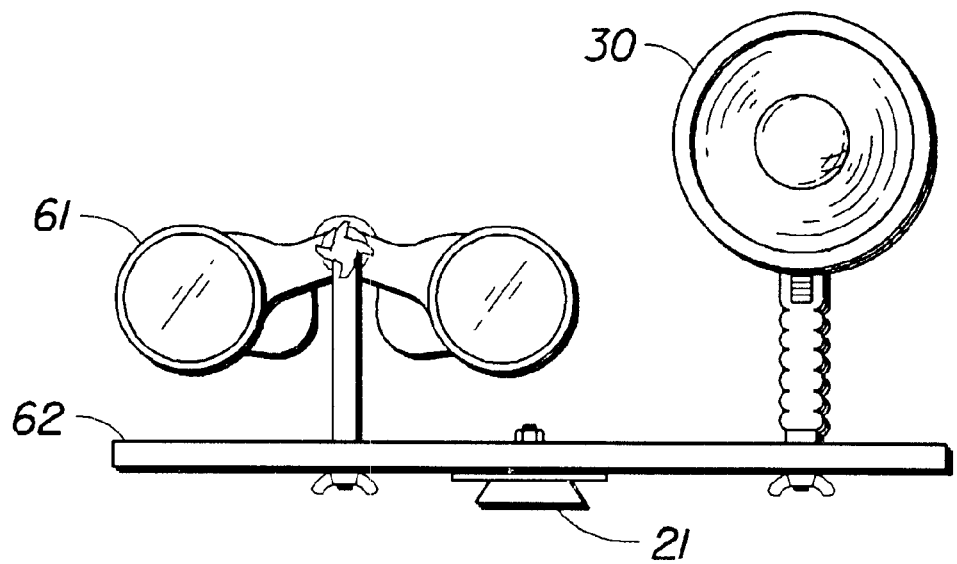
FIG. 5 is a front view of a quick release wireless spotlight and warning system with attached binoculars.

FIG. 4 illustrates a combination of a spot or flood light 30 with a video camera 60 mounted to the mounting bracket 20 while FIG. 5 illustrates another combination which includes a pair of binoculars 61 mounted in combination with a spot or flood light 30. The binoculars 61 includes a binocular bracket 62 which extends from the mounting bracket 20.

Figure 8:
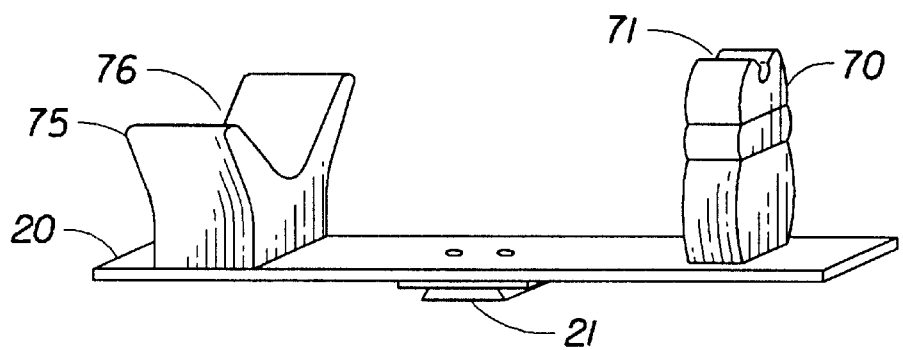
FIG. 8 is a side perspective view of a quick release gun stock and gun barrel support for attachment to the mounting bracket.
Figure 9:
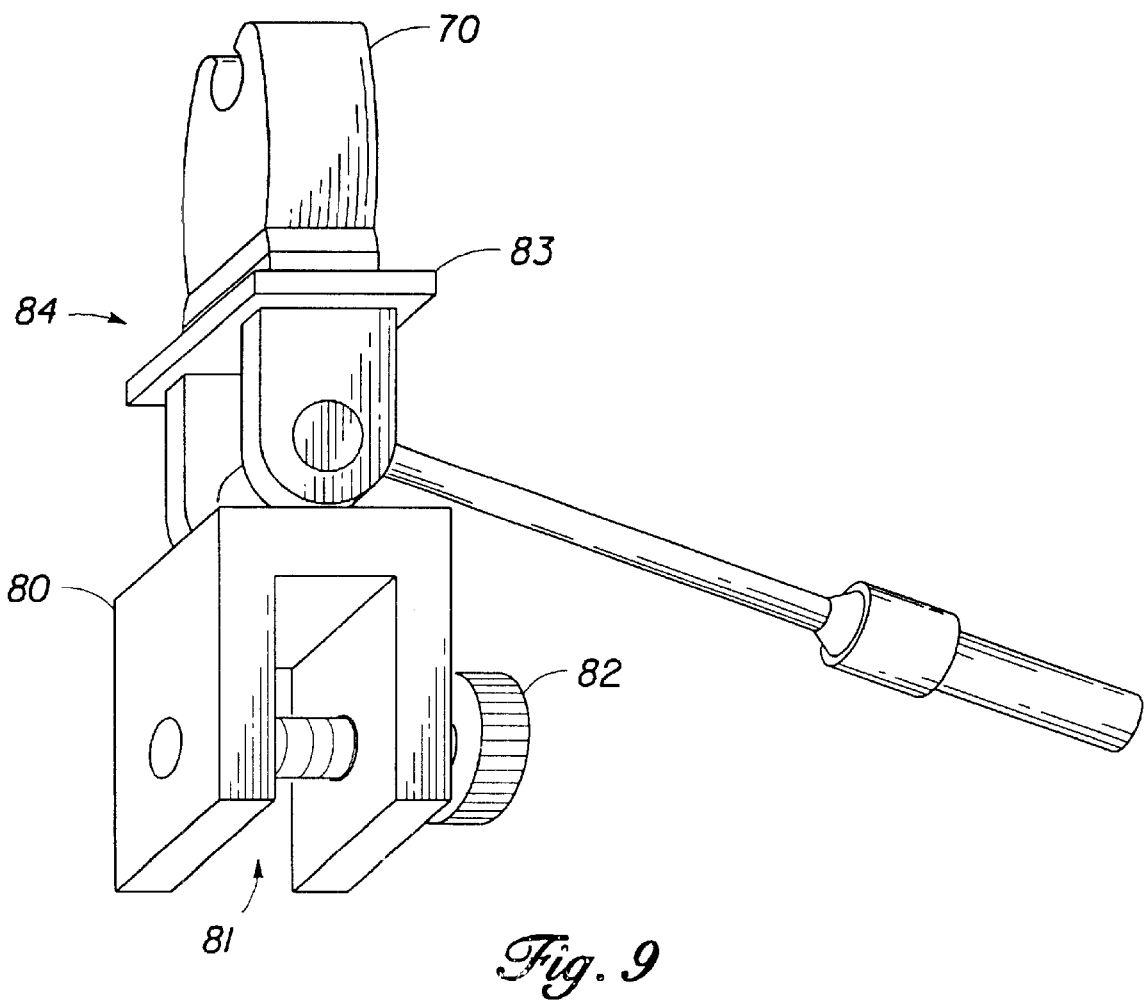
FIG. 9 is a perspective view of a quick release window clamp mount with an attached gun barrel support.
Figure 10:
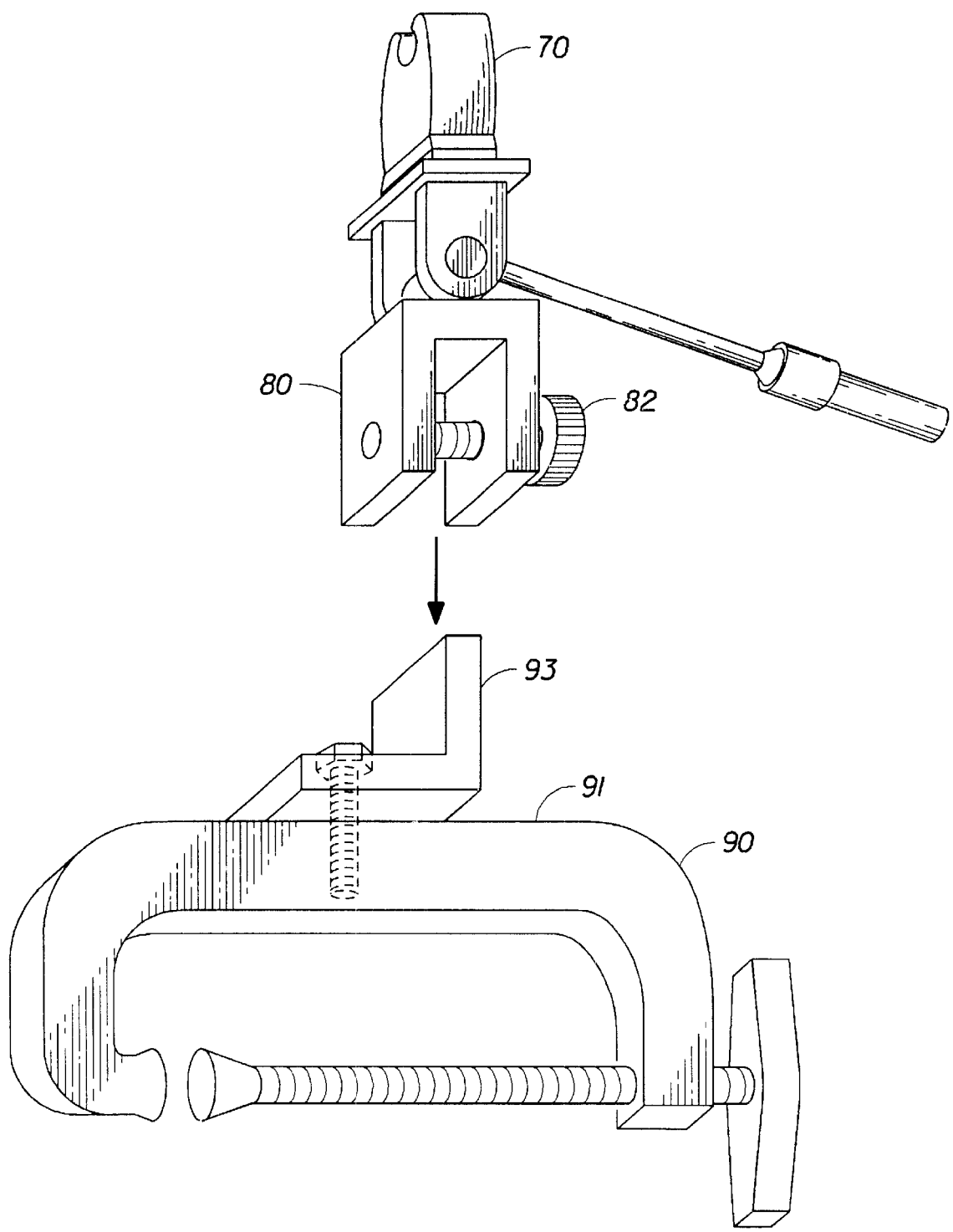
FIG. 10 is a side perspective view of a quick release window clamp mount attachable to clamp with added support.

FIG. 6 illustrates the quick release lighting system with a wireless light pivotally mounted with additional pivot mount 25 and gun mounting system in place. The gun mount and or support includes a gun barrel mount 70 and a gun stock support 75. The gun mounting system may utilize either the gun barrel mount 70 or the gun stock support 75 independently in use, as illustrated in FIGS. 6, 7, and 9 or in combination as illustrated in FIG. 8. The gun barrel mount 70 includes a slotted opening 71 while the material which comprises the gun barrel mount is dense rubber which is deformed when pushing a gun barrel into the opening and biased to return to original size to assist with retaining the gun barrel within the opening. The gun stock support 75 is also preferably constructed of rubber to prevent scratching of the gun stock and has a trough 76 which resembles a "V" in which the gun stock lays thereby providing support. FIG. 8 illustrates both the gun barrel mount 70 and the gun stock support 75 mounted on mounting bracket 20.

An alternative to the tripod support is illustrated in FIG. 9 which is a window clamp support 80 which includes a trough 81 for receiving a stable support surface and clamping screw 82 for tightening the clamp on the stable support surface, a pivoting support surface 83 extending from the clamp support with a mounting surface 84 for attaching gun barrel mount 70 or any other mounting brackets such as mounting bracket 20. Still another alternative to the tripod is illustrated in FIG. 7 which illustrates a C-clamp 90 with a flattened surface 91 for mounting bracket 20 or individual lights or accessories, such as a gun barrel mount 70.

C-clamp 90 is also adaptable to provide a mounting location for window clamp 80 with the addition of angle bracket 93 mounted to the flattened surface 91 on the C-clamp 90 the window clamp 80 is easily attachable larger dimensioned items which may have prevented the mounting of the window clamp.

Figure 11:
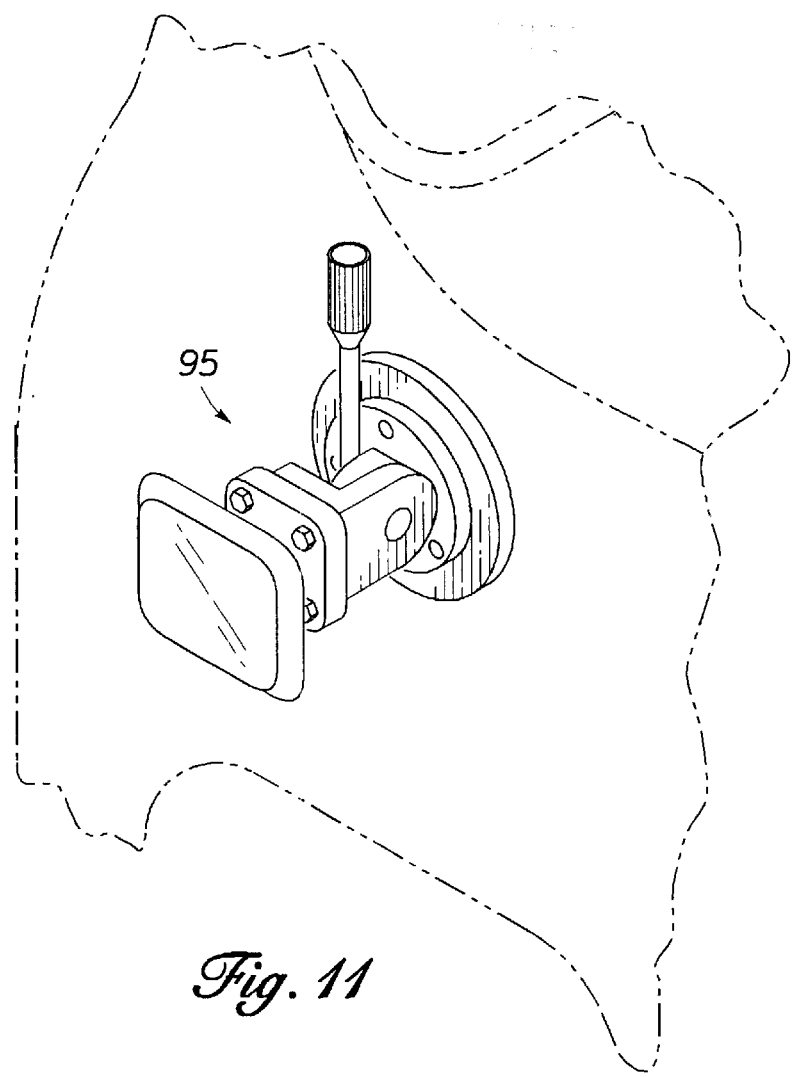
FIG. 11 is a perspective view of a quick release magnetic mount with attached red warning flasher magnetically attached in a vertical orientation to a side fender of a vehicle.
Figure 12:
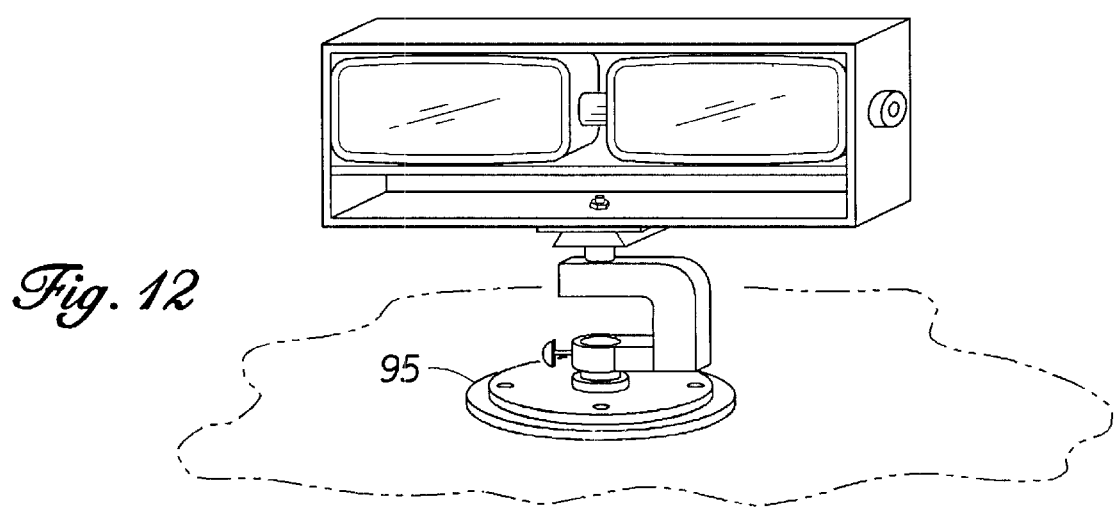
FIG. 12 is a perspective view of a quick release magnetic mount with attached quick release double flasher magnetically attached in a horizontal orientation to a roof top of a vehicle.

Magnetic clamp 95 is illustrated in FIGS. 11 and 12 wherein it is magnetically attached to metal surfaces on a vehicle in both a vertical and horizontal orientation. The magnetic mount 95 provides a mounting surface for attaching the lights and accessories described herein.

It is noted that the embodiment of the quick release wireless lighting system with support, mounting brackets, lights and accessories described herein in detail for exemplary purposes is of course subject to many different variations in structure, design, applications, and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What I claim is:

1. A wireless quick release lighting system with support, bracket, lights, accessories and power supply, comprising;

a) said support comprising a collapsible tripod support which includes a pivotal top mount for mounting a quick release bracket, b) a bracket with quick release mounting means providing a means for attaching the bracket to said support, c) lights releasably mounted to the bracket or to said support wherein the lights are either; flasher, spot, flood, emergency, directional, different colors, or strobe, d) accessories releasable mounted to the bracket or to said support wherein the accessories are selected from a group consisting of; a gun barrel mount, a gun stock support, a camera mount or a video camera mount, e) a power supply providing power to the light or lights which is provided by batteries or a cable connection to a direct current power supply, and f) wherein the lights further comprise text messages.

2. The wireless quick release lighting system as set forth in claim 1 wherein the tripod support further comprises support legs with reflective elements attached thereto.

3. The wireless quick release lighting system as set forth in claim 1 wherein the tripod support further comprises a flasher light attached below the pivotal top mount.

4. The wireless quick release lighting system as set forth in claim 1 wherein the lights and accessories may be attached to the bracket in combination of lights and any one accessory.

5. The wireless quick release lighting system as set forth in claim 1 wherein the gun barrel mount further comprises a rubber block with slotted opening for receiving a gun barrel.

6. The wireless quick release lighting system as set forth in claim 1 wherein the gun stock support further comprises a rubber block with a trough resembling a "V" for supporting a gun stock.

* * * * *